United States Patent [19]
Shibahata et al.

[11] Patent Number: 5,279,384
[45] Date of Patent: Jan. 18, 1994

[54] FRONT AND REAR ROAD WHEEL DRIVE APPARATUS FOR MOTOR VEHICLE

[75] Inventors: Yasuji Shibahata, Tochigi; Shinji Ohkuma, Tokyo, both of Japan

[73] Assignee: Honda Giken Kogyo Kabushiki Kaisha, Tokyo, Japan

[21] Appl. No.: 913,989

[22] Filed: Jul. 17, 1992

Related U.S. Application Data

[63] Continuation of Ser. No. 322,371, Mar. 13, 1989, abandoned.

[30] Foreign Application Priority Data

Mar. 14, 1988 [JP] Japan .................. 63-61668

[51] Int. Cl.$^5$ .......................................... B60K 17/344
[52] U.S. Cl. ................................ 180/248; 74/665 F
[58] Field of Search .......... 180/233, 245, 247, 248, 180/249, 244; 74/665 R, 665 B, 665 F, 665 G, 665 S, 665 T, 745; 475/221, 249

[56] References Cited

U.S. PATENT DOCUMENTS

| | | | |
|---|---|---|---|
| 4,792,009 | 12/1988 | Iritani | 180/233 |
| 4,895,217 | 1/1990 | Hueckler et al. | 180/248 |

FOREIGN PATENT DOCUMENTS

| | | |
|---|---|---|
| 0128436 | 3/1986 | European Pat. Off. . |
| 0247820 | 12/1987 | European Pat. Off. . |
| 2720459 | 12/1987 | Fed. Rep. of Germany . |
| 62-94421 | 4/1987 | Japan . |
| 63-7845 | 8/1987 | Japan . |
| 2136748A | 3/1983 | United Kingdom . |

*Primary Examiner*—Richard M. Camby
*Attorney, Agent, or Firm*—Armstrong, Westerman, Hattori, McLeland & Naughton

[57] ABSTRACT

A motor vehicle has a pair of main drive road wheels, a pair of auxiliary drive road wheels, and a differential disposed between the auxiliary drive road wheels, the main and auxiliary drive road wheels serving as the front and rear road wheels of the motor vehicle. An apparatus for driving the front and rear road wheels includes a speed increasing device disposed in a power transmission path leading to the differential between the auxiliary drive road wheels, detecting means for detecting a speed of travel of the motor vehicle and a steering variable, and control member for enabling the speed increasing device by predicting a turn of the motor vehicle based on the detected speed and the detected steering variable.

11 Claims, 7 Drawing Sheets

FRONT AND REAR ROAD WHEEL DRIVE APPARATUS FOR MOTOR VEHICLE

This application is a continuation of application Ser. No. 07/322,371 filed Mar. 13, 1989 abandoned.

BACKGROUND OF THE INVENTION

1. Field of the Invention

The present invention relates to an apparatus for driving the front and rear road wheels of a motor vehicle, and moro particularly to an apparatus for driving the front and rear road wheels of a motor vehicle, which apparatus includes torque transmission clutches capable of adjusting the amounts of torque to be transmitted to a pair of laterally spaced auxiliary drive road wheels, and a speed increasing device disposed in a power transmission path connected to the driven wheels, the speed increasing device being capable of changing the speed of rotation.

2. Description of the Relevant Art

Figure 1:
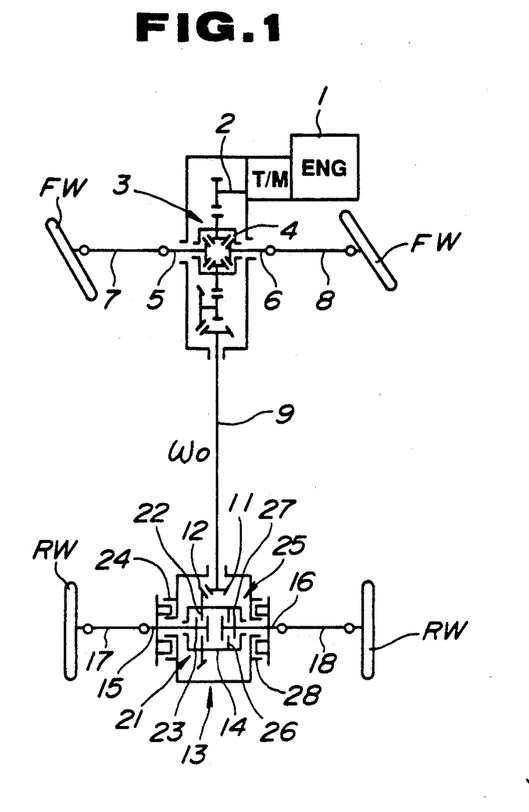
FIG. 1 is a schematic view of a drive system of a 4 WD motor vehicle which is structurally based on an FF motor vehicle and in which a front and rear road wheel drive apparatus according to the present invention can be incorporated.

As shown in FIG. 1 of the accompanying drawings, there is known a front and rear road wheel drive motor vehicle (hereinafter referred to as a "4WD motor vehicle) in which drive power from an engine 1 is transmitted through a transmission T/M and an output shaft 2 thereof to a front wheel differential 3 comprising a differential case 4 and a pair of output shafts 5, 6 coupled to respective front road wheels FW through drive axles 7, 8, respectively, and then the drive power is transmitted from the front wheel differential 3 through a propeller shaft 9 to a rear wheel differential 13 for driving a pair of rear road wheels RW. The rear wheel differential 13 has a differential case 14 to which the rear end of the propeller shaft 9 is coupled through meshing gears 11, 12. The differential case 14 is combined with a pair of torque transmitting clutches (e.g., hydraulic multiplate clutches) 21, 25 mounted respectively on output shafts 15, 16 coupled to the respective rear road wheels RW through drive axles 17, 18, respectively. The hydraulic multiplate clutches 21, 25 are controlled by a hydraulic pressure control system (not shown) for varying the drive power to be transmitted to the output axles 15, 16.

More specifically, the hydraulic multiplate clutches 21, 25 comprise outer plates 22, 26, respectively, fixed to lefthand and righthand portions of the differential case 14 and inner plates 23, 27, respectively, fixed to the respective output axles 15, 16 and alternating with the outer plates 22, 26. The drive power to be transmitted to the output axles 15, 16 can be varied by introducing oil under pressure into hydraulic pressure chambers 24, 28 of the respective clutches 21, 25.

Figure 2:
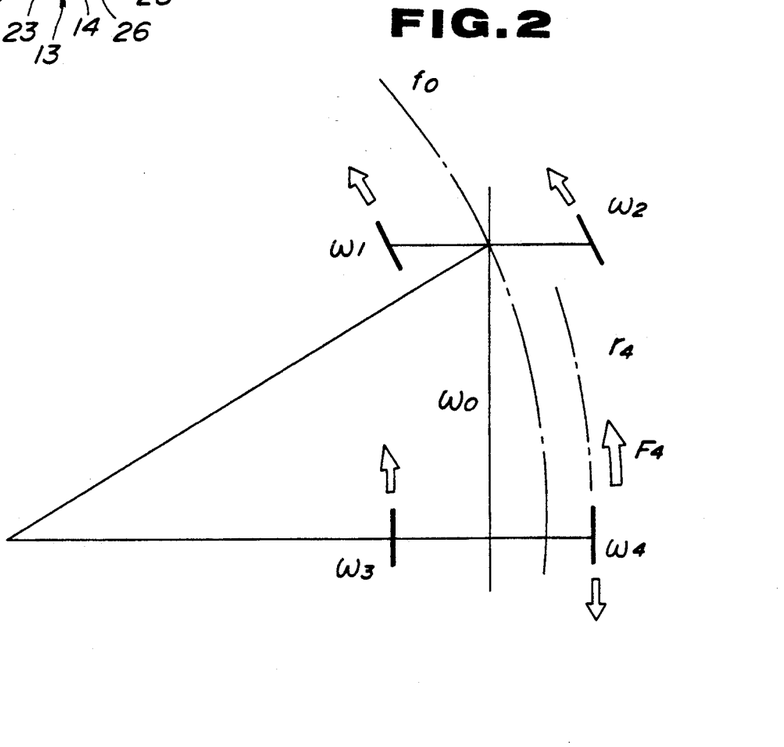
FIG. 2 is a diagram showing the manner in which the 4 WD motor vehicle of FIG. 1 makes a turn and also showing operation of the front and rear road wheel drive apparatus.

Now, it is assumed that the 4WD motor vehicle makes a turn as shown in FIG. 2. When the motor vehicle is smoothly steered while the engine power is small and the front road wheels FW are subjected to a small degree of slippage, the outer rear wheel RW (with respect to the turning circle) which is an auxiliary drive road wheel runs along a path $r_4$ that is positioned outwardly of an average path $f_0$ of the front road wheels FW which are main drive road wheels. Ideally, therefore, the rotational speeds $\omega_1$, $\omega_2$ of the inner and outer front road wheels FW, the rotational speed $\omega_0$ of the propeller shaft 9, and the rotational speeds $\omega_8$, $\omega_4$ of the inner and outer rear road wheels RW should preferably meet the following relationship:

$$\frac{\omega_1 + \omega_2}{2} < \omega_4 \left( \omega_0 = \frac{\omega_1 + \omega_2}{2} \right)$$

In the 4WD motor vehicle shown in FIG. 1, however, even if the pressure applied to the hydraulic multiplate clutch 25 associated with the outer rear road wheel RW is increased, the rotational speed $\omega_4$ does not exceed the rotational speed $\omega_0$, but is equal to the rotational speed $\omega_0$ at most. It has been unable to produce drive power to rotate the outer rear road wheel RW so that the relationship $\omega_0 < \omega_4$ will be achieved. Consequently, the motor vehicle undergoes tight-corner braking when making a turn.

If the pressure applied to the hydraulic multiplate clutch 25 coupled to the outer rear road wheel RW were lowered, then the condition $\omega_0 < \omega_4$ would be reached, but this would fail to accomplish the advantages of the 4WD motor vehicle resulting from the positive driving of all the front and rear road wheels.

The 4WD motor vehicle shown in FIG. 1 is structurally based on a front-engine, front-wheel-drive (FF) motor vehicle. However, the above problems are also associated with a 4WD motor vehicle which is structurally based on a rear-engine, rear-wheel-drive (RR) motor vehicle.

Figure 3:
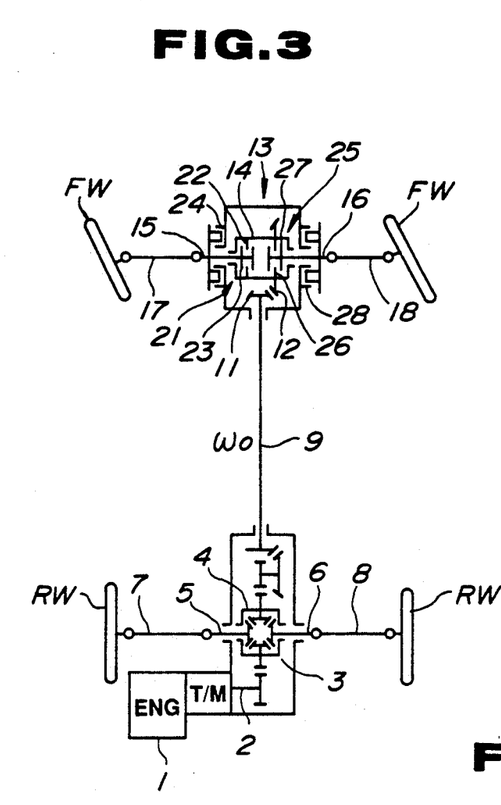
FIG. 3 is a schematic view of a drive system of a 4 WD motor vehicle which is structurally based on a RR motor vehicle and in which a front and rear road wheel drive apparatus according to the present invention can be incorporated.

More specifically, FIG. 3 shows a 4WD motor vehicle in which engine power is transmitted from a transmission output shaft 2 to a rear wheel differential 3 and then transmitted from the rear wheel differential 3 through a propeller shaft 9 to a front wheel differential 13. The front wheel differential 13 has hydraulic multiplate clutches 21, 25, identical to those shown in FIG. 1, disposed in a differential case 14 and mounted respectively on front wheel output shafts 15, 16.

Figure 4:
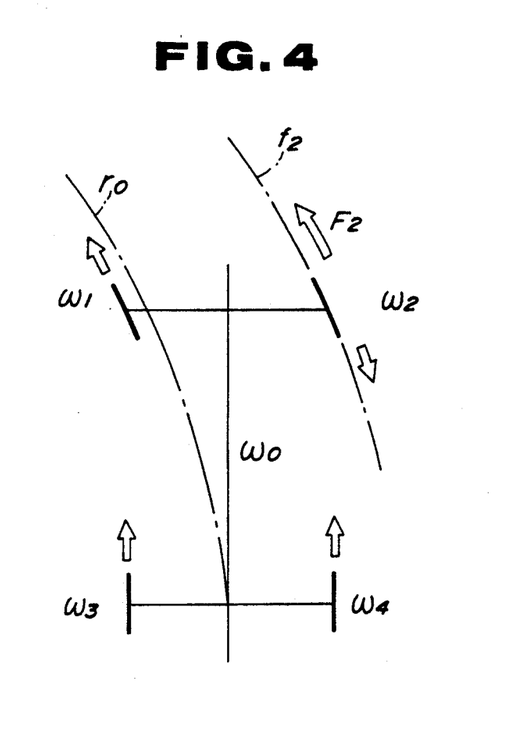
FIG. 4 is a diagram showing the manner in which the 4 WD motor vehicle of FIG. 3 makes a turn and also showing operation of the front and rear road wheel drive apparatus.

When the 4WD motor vehicle makes a turn as shown in FIG. 4, since the outer front wheel (with respect to the turning circle) which is an auxiliary drive road wheel runs along a path $f_2$ that is positioned outwardly of an average path $r_0$ of the rear road wheels which are main drive road wheels, the following relationship should preferably be met:

$$\frac{\omega_3 + \omega_4}{2} < \omega_2 \left( \omega_0 = \frac{\omega_3 + \omega_4}{2} \right)$$

However, even if the pressure applied to the hydraulic multiplate clutch 25 associated with the outer front road wheel is increased, it is unable to produce drive power to rotate the outer front road wheel so that the relationship $\omega_0 < \omega_2$ will be achieved.

This also holds true for a 4WD motor vehicle that is structurally based on a front-engine, rear-wheel-drive (FR) motor vehicle, not shown, and also for a midship-engine, rear-wheel-drive motor vehicle, not shown.

One solution to the above problem is to provide a speed increasing device having a speed changing capability and disposed in a drive power transmitting path from a differential coupled to main drive road wheels to a differential coupled to the auxiliary drive road wheels, the speed increasing device being controllable to make drive power applied to the main drive road wheels smaller than drive power imposed on the auxiliary drive road wheels. A drive torque applied to an outer one of the auxiliary drive road wheels can be larger than a drive torque applied to an inner one of the auxiliary drive road wheels by controlling a pair of torque transmitting clutches, thus improving operating performance or abilities, such as turning performance or ability, of the motor vehicle.

When the motor vehicle makes a turn, the speed increasing device in the power transmission path has to be switched to a speed increasing mode. If the speed increasing device is switched after the turn of the motor vehicle has been detected, however, a control time lag or delay is developed, and hence the response of the speed increasing device is limited.

SUMMARY OF THE INVENTION

In view of the aforesaid conventional drawbacks, it is an object of the present invention to provide an apparatus for driving the front and rear road wheels of a 4WD motor vehicle which has a speed increasing device in a power transmission path leading to at least auxiliary drive road wheels, the apparatus being capable of detecting a vehicle speed and a steering variable such as a steering force, a steering angle, or the like, and of predicting various turns of the motor vehicle based on the detected vehicle speed and steering variable, so that the speed increasing device can be switched instantaneously with good response while eliminating any control time lag or delay.

According to the present invention, there is provided an apparatus for driving the front and rear road wheels of a motor vehicle having a pair of main drive road wheels, a pair of auxiliary drive road wheels, the main and auxiliary drive road wheels serving as the front and rear road wheels, and a differential disposed between the auxiliary drive road wheels, said apparatus comprising: a speed increasing device disposed in a power transmission path leading to said differential between the auxiliary drive road wheels; detecting means for detecting a speed of travel of the motor vehicle and a steering variable; and control means for enabling said speed increasing device by predicting a turn of the motor vehicle based on the detected speed and the detected steering variable.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Like or corresponding parts are denoted by like or corresponding reference numerals throughout views.

A front and rear road wheel drive apparatus according to the present invention can be incorporated in a 4 WD motor vehicle structurally based on an FF motor vehicle as shown in FIG. 1, a 4 WD motor vehicle structurally based on a RR motor vehicle as shown in FIG. 3, or a 4 WD motor vehicle structurally based on an FR motor vehicle. A speed increasing device according to the present invention in the front and rear road wheel drive apparatus is basically mounted on a propeller shaft 9 serving as a drive power transmitting path extending from a differential 3 associated with main drive road wheels to a differential 13 associated with auxiliary drive road wheels as shown in each of FIGS. 1 and 3.

Figure 5:
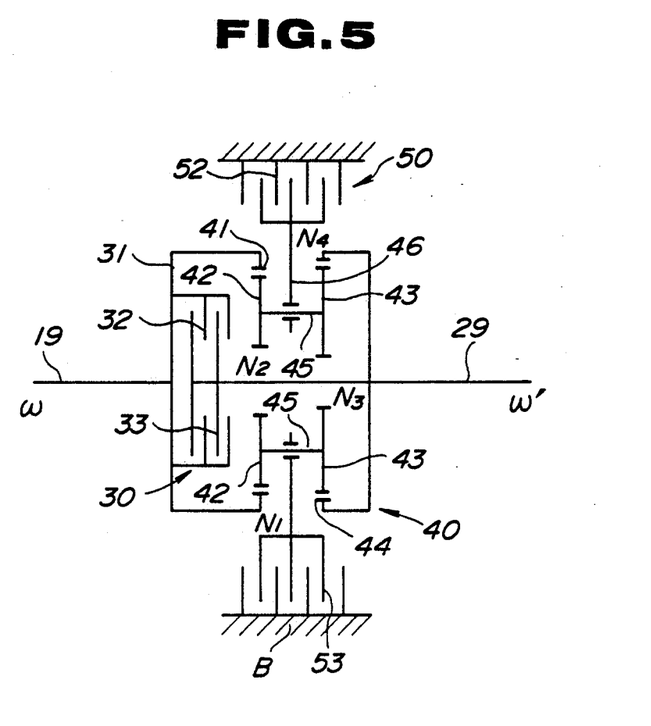
FIG. 5 is a schematic view of a speed increasing device according to a first embodiment of the present invention.

FIG. 5 schematically shows a speed increasing device according to a first embodiment of the present invention which is included in the front and rear road wheel drive apparatus. The speed increasing device essentially comprises an input shaft 19, an output shaft 29, a direct coupling clutch 30, a speed increasing mechanism 40, and a speed increasing clutch 50. The input shaft 19 receives drive power from the main drive road wheel differential 3 as illustrated in FIGS. 1 and 3, and drive power from the output shaft 29 is transmitted to the auxiliary drive road wheel differential 13.

As shown in FIG. 5, the direct coupling clutch 30 is disposed between the input shaft 19 and the output shaft 29. The direct coupling clutch 30 is in the form of a hydraulic multiplate clutch comprising a drum 31 integrally mounted on an end of the input shaft 19, outer plates 32 disposed in and fixed to the drum 31, and inner plates 33 fixedly mounted on an end of the output shaft 29 and alternating with the outer plates 32. The speed increasing mechanism 40 is positioned between the clutch drum 31 and the output shaft 29. The speed increasing mechanism 40 is in the form of a planetary gear mechanism comprising an internal gear 41 on an end of the clutch drum 31, a plurality of smaller pinion gears 42 meshing with the internal gear 41, a plurality of larger pinion gears 43 coupled respectively to the smaller pinion gears 42 through respective connecting shafts 45 for rotation therewith, and an internal gear 44 meshing with the larger pinion gears 43 and fixedly mounted on the output shaft 29.

The connecting shafts 45 between the pinion gears 42, 43 are supported on a carrier 46. The speed increasing clutch 50 is connected between the carrier 46 and a motor vehicle body B, the speed increasing clutch 50 comprising a hydraulic multiplate clutch having outer plates 52 fixed to the motor vehicle body B and inner plates 53 fixed to the carrier 46 and alternating with the outer plates 52.

The number $N_1$ of teeth of the internal gear 41 on the input shaft 19, the number $N_2$ of teeth of the smaller pinion gears 42, the number $N_3$ of teeth of each of the larger pinion gears 43, and the number $N_4$ of teeth of each of the internal gear 44 on the output shaft 29 are selected to meet the following relationship:

$$\frac{N_1}{N_2} \times \frac{N_3}{N_4} > 1.0 \quad (1)$$

The propeller shaft 9 serving as the drive power transmitting path between the front and rear road wheels of the 4 WD motor vehicle is therefore combined with either the speed increasing device which comprises the direct coupling clutch 30, the speed increasing mechanism 40, and the speed increasing clutch 50 for providing a speed changing function, or a speed increasing device capable of changing the speed of rotation of the input shaft.

When the direct coupling clutch 30 is engaged or ON and the speed increasing clutch 50 is disengaged or OFF, drive power from the input shaft 19 is directly transmitted to the output shaft 29 through the direct coupling clutch 30. At this time, the speed increasing mechanism 40 idly rotates since the speed increasing clutch 50 is OFF. Accordingly, the rotational speed $\omega'$ of the output shaft 29 is equal to the rotational speed $\omega$ of the input shaft 19 ($\omega' = \omega$).

When the direct coupling clutch 30 is OFF and the speed increasing clutch 50 is ON, drive power from the input shaft 19 is transmitted through the speed increasing mechanism 40, i.e., the internal gear 41, the smaller pinion gears 42, the connecting shafts 45, the larger pinion gears 43, and the internal gear 44 to the output shaft 29 while bypassing the direct coupling clutch 30. At this time, the rotational speed $\omega'$ of the output shaft 29 and the rotational speed $\omega$ of the input shaft 19 are related to each other as follows:

$$\omega' = \frac{N_1}{N_2} \times \frac{N_3}{N_4} \times \omega \quad (2)$$

Therefore, the rotational speed $\omega'$ of the output shaft 29 is higher than the rotational speed $\omega$ of the input shaft 19 ($\omega' > \omega$).

Since the drive power from the engine can be transmitted to the differential 13 associated with the auxiliary drive road wheels through the speed increasing mechanism 40, the drive power applied to the auxiliary drive road wheels can be made greater than the drive power applied to the main drive road wheels. Stated otherwise, the drive power from the differential 3 coupled to the main drive road wheels is increased in its rotational speed and then transmitted to the differential 13 coupled to the auxiliary drive road wheels, and as a result greater drive power can be applied to the auxiliary drive road wheels than to the main drive road wheels.

By operating a hydraulic pressure control device (described later) to send high oil pressure into a hydraulic multiplate clutch coupled to an outer road wheel, e.g., the hydraulic multiplate clutch 25, for example, in the auxiliary drive road wheel differential 13, when the motor vehicle makes a turn, the inner plates 27 and the outer plates 26 are frictionally engaged to connect the clutch 25 to transmit the drive power with an increased speed to the output shaft 16 connected to the outer road wheel.

While the motor vehicle is making a turn as shown in FIG. 2, the drive torque applied to the outer rear road wheel which is an auxiliary drive road wheel is rendered greater than the drive torque applied to the inner rear road wheel, as indicated by the arrow $F_4$, so that the turning performance or ability of the 4 WD motor vehicle can be improved in low- and medium-speed ranges.

Conversely, it is also possible to increase the drive torque applied to the inner rear road wheel greater than the drive torque applied to the outer rear road wheel for higher running stability of the motor vehicle in a high-speed range.

Likewise, while the motor vehicle is making a turn as shown in FIG. 4, the drive torque applied to the outer front road wheel which is an auxiliary drive road wheel is rendered greater than the drive torque applied to the inner front road wheel, as indicated by the arrow $F_2$ for improving the turning performance or ability of the 4 WD motor vehicle in low- and medium-speed ranges. Conversely, the drive torque applied to the inner front road wheel is increased greater than the drive torque applied to the outer rear road wheel for higher running stability of the motor vehicle in a high-speed range.

As described above, the drive power applied to the auxiliary drive road wheels can be made greater than the drive power applied to the main drive road wheels without lowering or losing the merits or advantages of the 4 WD motor vehicle which drives all the four wheels. Consequently, the operating performance of the motor vehicle such as the turning performance in low- and medium-speed ranges and the running stability in a high-speed range can be improved by controlling the hydraulic multiplate clutches (i.e., the torque transmitting clutches) in the differential associated with the auxiliary drive road wheels.

Figure 6:
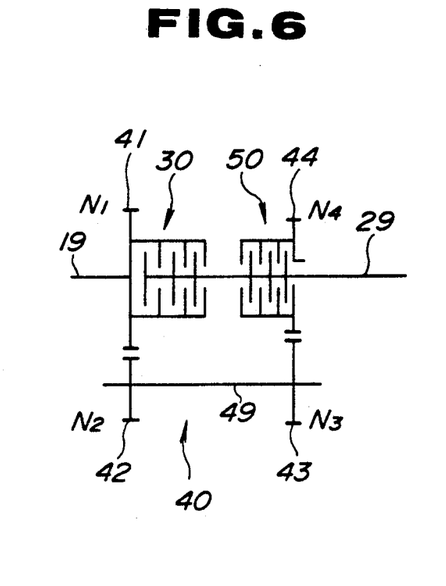
FIG. 6 is a schematic view of a speed increasing device according to a second embodiment of the present invention.

FIG. 6 schematically shows a speed increasing device according to a second embodiment of the present invention. The speed increasing device includes a speed increasing mechanism 40 comprising a hydraulic multiplate direct coupling clutch 30 and a gear 41 (the number of teeth: $N_1$) which are mounted on an input shaft 19, a gear 42 (the number of teeth: $N_2$) meshing with the gear 41 and mounted on a countershaft 49 parallel to the input shaft 19, a gear 43 (the number of teeth: $N_3$) mounted on the countershaft 49, and a hydraulic multiplate speed increasing clutch 50 through which a gear 44 (the number of teeth: $N_4$) is connected to an output shaft 29, the gear 44 being held in mesh with the gear 43. The speed increasing device shown in FIG. 6 has the same function as that of the speed increasing device according to the first embodiment by selecting the numbers of teeth of these gears 41, 42, 43, 44 to meet the relationship (1) given above.

Figure 7:
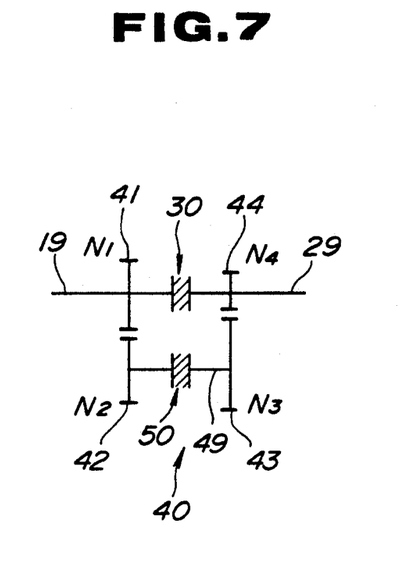
FIG. 7 is a schematic view of a speed increasing device according to a third embodiment of the present invention.

FIG. 7 schematically illustrates a speed increasing device according to a third embodiment of the present invention. The speed increasing device of FIG. 7 includes a speed increasing mechanism 40 comprising a gear 41 ($N_1$), a gear 42 ($N_2$) meshing with the gear 41 and mounted on a countershaft 49, a gear 43 ($N_3$) mounted on the countershaft 49, and a gear 44 ($N_4$) mounted on an output shaft 29 and meshing with the gear 43. The speed increasing mechanism 40 also includes a direct coupling clutch 30 disposed between the input and output shafts 19, 29. The countershaft 49 is divided into two shaft portions supporting the gears 42, 43, respectively, and selectively connectable and disconnectable by a speed increasing clutch 50 therebetween. The speed increasing device of FIG. 7 also has the same function as that of the speed increasing device according to the first embodiment by selecting the numbers of teeth of the gears 41, 42, 43, 44 to meet the relationship (1).

The clutches in the speed increasing device are not limited to hydraulic multiplate clutches, but may be solenoid-operated clutches. Alternatively, the direct coupling clutch may be a one-way clutch and the speed increasing clutch may be a hydraulic multiplate clutch. Furthermore, these clutches may be dog clutches or any other desired clutches.

Figure 8:
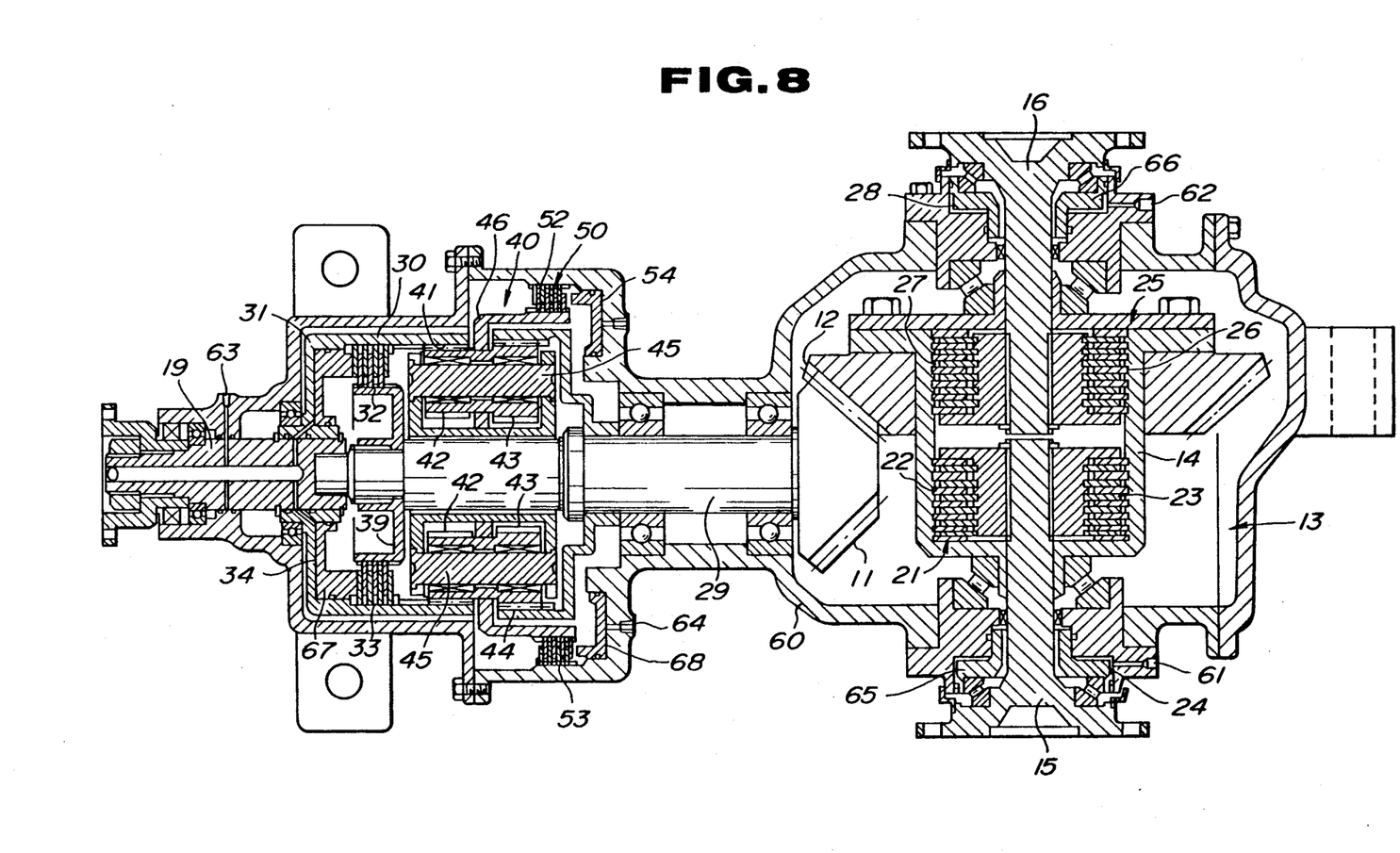
FIG. 8 is a horizontal cross-sectional view showing specific structural details of the speed increasing device of the first embodiment and a differential associated with auxiliary drive road wheels.

FIG. 8 specifically shows structural details of the speed increasing device and the differential associated with the auxiliary drive road wheels in the front and rear road wheel drive apparatus according to the present invention. The speed increasing device shown in FIG. 8 is basically identical to the speed increasing device in accordance with the first embodiment of the present invention.

As shown in FIG. 8, the speed increasing device and the differential are accommodated in a housing 60 supported on a motor vehicle body (not shown).

When oil pressure is supplied to the direct coupling clutch 30 through a port 63, a hydraulic pressure chamber 34 thereof is expanded to move a piston 67 axially to the right. The axial movement of the piston 67 presses the outer plates 32 on the input shaft 19 toward the inner plates 33 supported on a holder 39 fixed to the end of the output shaft 29, thereby bringing these outer and inner plates 32, 33 into frictional engagement dependent on the supplied oil pressure. The speed increasing clutch 50 is supplied with oil pressure via a port 64 to expand a hydraulic pressure chamber 54 to move a piston 68 axially. Upon axial movement of the piston 68, the outer plates 52 supported in the housing 60 and the inner plates 53 on the carrier 46 are pressed toward each other and frictionally engaged dependent on the supplied oil pressure. In the differential to which drive power is applied from the output shaft 29, the output shafts 15, 16 are moved outwardly away from each other in unison with pistons 65, 66 by oil pressure introduced into the hydraulic pressure chambers 24, 28 of the hydraulic multiplate clutches 21, 25 through respective ports 61, 62. The outer plates 22, 26 and the inner plates 23, 27 are thus frictionally engaged by forces dependent on the supplied oil pressure.

Figure 9:
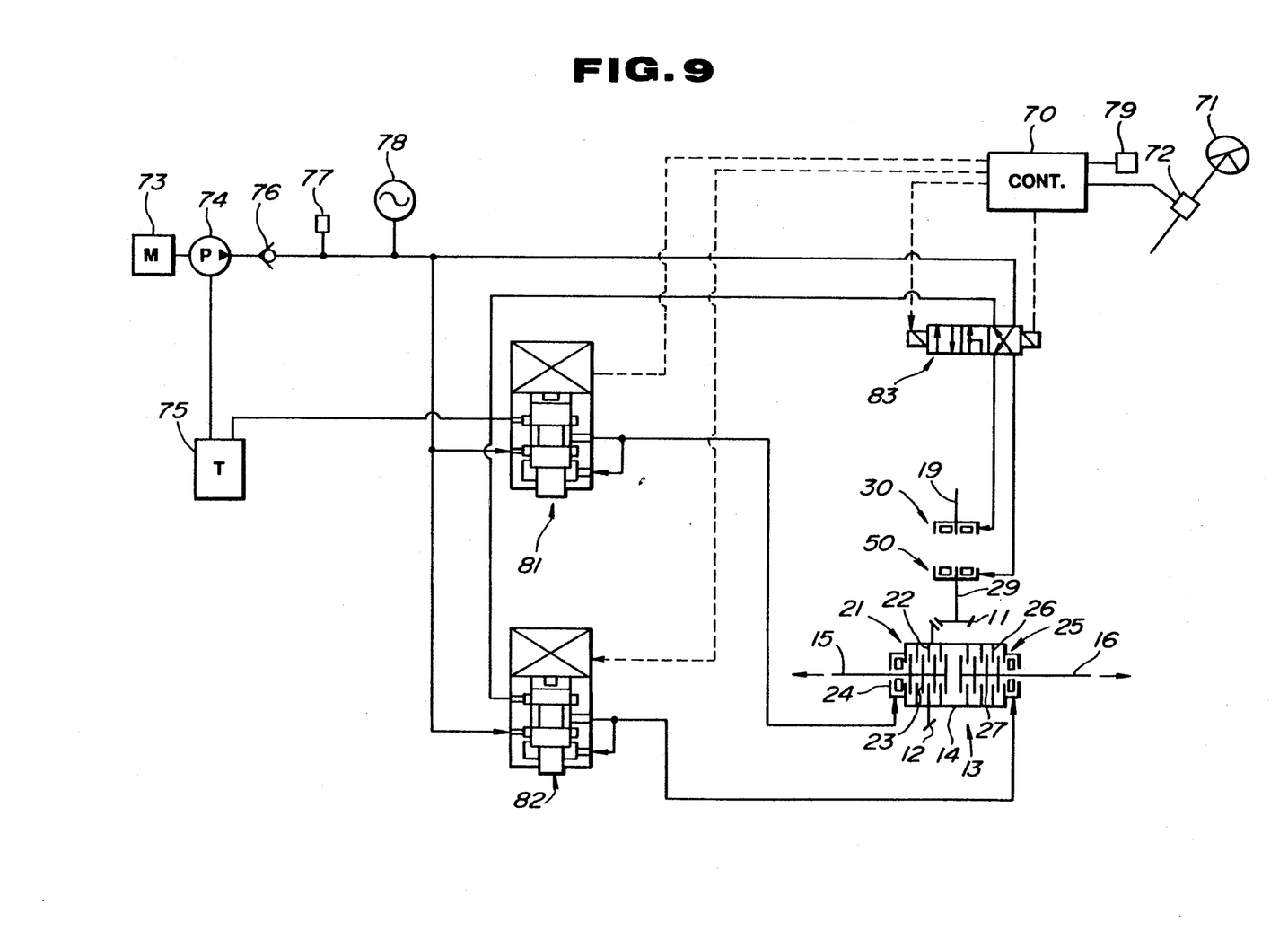
FIG. 9 is a diagram of a hydraulic pressure control circuit for controlling the front and rear road wheel drive apparatus of the present invention which is mounted on a motor vehicle.

FIG. 9 shows by way of example a hydraulic pressure control circuit for controlling the front and rear road wheel drive apparatus of the present invention which is mounted on a motor vehicle. The hydraulic pressure control circuit includes a control unit 70, a steering wheel 71, a steering force sensor 72, a motor 73, an oil pump 74, an oil tank 75, a check valve 76, an oil pressure switch 77, an accumulator 78, a pair of pressure regulating valves 81, 82 for controlling the hydraulic multiplate clutches 21, 25 coupled to the road wheels, and a solenoid-operated directional control valve 83 of a speed increasing device.

The pressure regulating valves 81, 82 for controlling the hydraulic multiplate clutches 21, 25 and the solenoid-operated directional control valve 83 shared by the direct coupling clutch 30 and the speed increasing clutch 50 are arranged parallel to each other with respect to the oil pressure source.

The control unit 70 controls the pressure regulating valves 81, 82 and the directional control valve 83 with control signals based on operating conditions (turning conditions) of the motor vehicle such for example as a steering force detected by the sensor 72, for regulating oil pressures supplied to the hydraulic multiplate clutches 21, 25 and selectively engaging and disengaging (i.e., turning ON and OFF) the direct coupling clutch 30 and the speed increasing clutch 50.

The hydraulic pressure control circuit shown in FIG. 9 can control the hydraulic multiplate clutches 21, 25 independently of each other.

Figure 10:
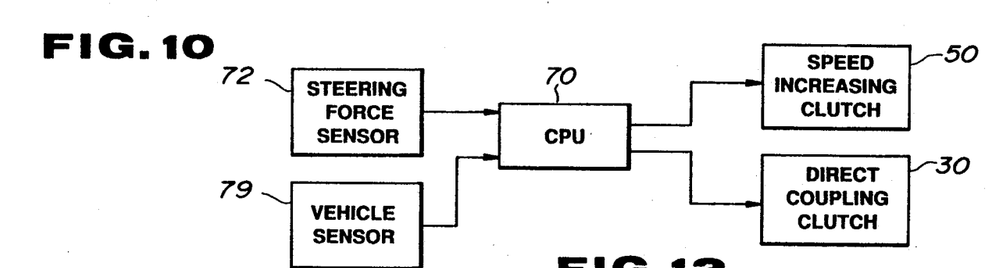
FIG. 10 is a block diagram of a speed increasing device of the present invention.
Figure 11:
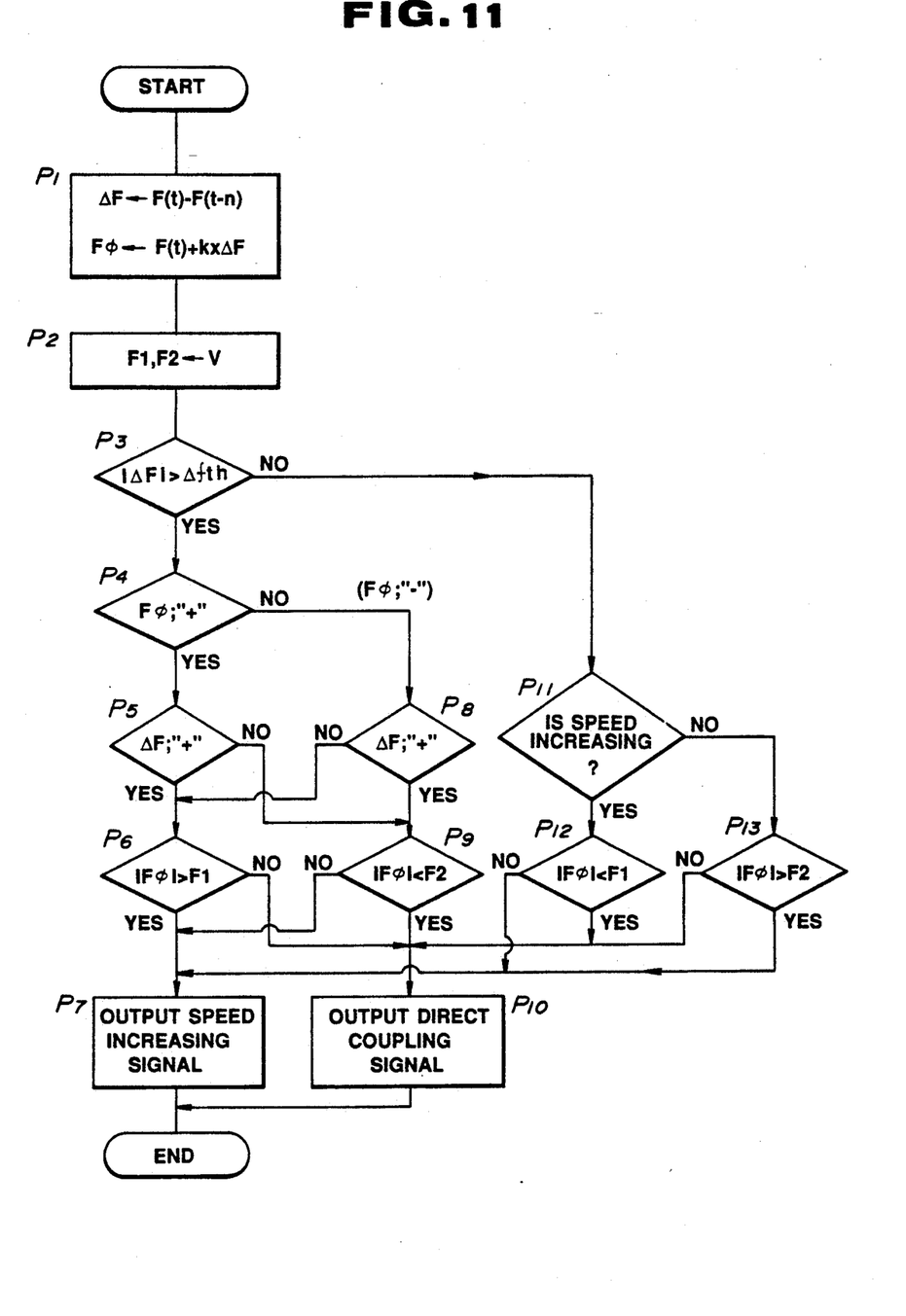
FIG. 11 is a flowchart of a control sequence of the speed increasing device.

The direct coupling clutch 30 and the speed increasing clutch 50 are engaged and disengaged according to the following control sequence:

The steering signal and the vehicle speed signal which are detected by the sensors 72, 79 are applied to the control unit 70 which processes the applied signals to produce on/off control signals for the direct coupling clutch 30 and the speed increasing clutch 50. FIG. 11 is a flowchart of a speed increasing control sequence.

First, a step $P_1$ calculates the difference or steering force shift $\Delta F$ between a steering force $F(t)$ at a time (t) and a steering force $F(t-n)$ at a preceding time $(t-n)$, and also calculates a corrected value or a predicted value $F\phi$ of the steering force according to a correcting equation $F\phi = F(t) + k \cdot \Delta F$ (where k is a weighting coefficient). The steering force has a sign of "+" if the steering direction is to the right or left, and a sign of "−" if the steering direction is opposite.

Figure 12:
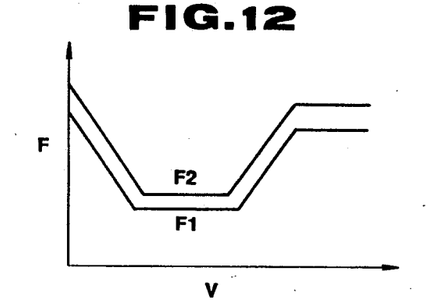
FIG. 12 is a graph showing the correlation between steering force thresholds and a vehicle speed.

In a next step $P_2$, lower and upper thresholds F1, F2 for the steering force are determined from the vehicle speed V at the time. The lower and upper thresholds F1, F2 are given as functions of the vehicle speed V as shown in FIG. 12, and stored as a map in a memory.

A step $P_3$ determines whether the steering force shift or change $\Delta F$ is larger than a preset constant $\Delta F th$. If "YES", then control goes to a next step $P_4$, and if "NO", then control goes to a step $P_{11}$.

The step $P_4$ determines whether the sign of the corrected value $F\phi$ of the steering force is "+" or not (i.e., determines the steering direction). If "YES", then control proceeds to a next step $P_5$, and if "NO", then control goes to a step $P_6$.

Each of the steps $P_5$, $P_8$ determines whether the sign of the steering force shift $\Delta F$ is "+" or not. If "YES" in the step $P_5$, control goes to a next step $P_6$, and if "NO" in the step $P_5$, then control goes to a step $P_9$. If "YES" in the step $P_8$, control goes to the next step $P_9$, and if "NO" in the step $P_8$, then control goes to the step $P_6$.

The step $P_6$ determines whether the corrected value $F\phi$ of the steering force is larger than the lower threshold F1. If "YES", then control goes to a next step P, which outputs a speed increasing signal. If "NO", then control goes to a step $P_{10}$ which outputs a direct coupling signal.

The step $P_9$ determines whether the corrected value $F\phi$ of the steering force is smaller than the upper threshold F2. If "YES", then control goes to the next step $P_{10}$ which outputs a direct coupling signal. If "NO", then control goes to the step P, which outputs a speed increasing signal.

The step $P_{11}$ determines through a feedback loop whether the speed is on the increase (i.e., whether the speed increasing clutch 50 is engaged or not. If "YES", then control proceeds to a next step $P_{12}$ and if "NO", then control goes to a step $P_{12}$.

The step $P_{12}$ determines whether the corrected value $F\phi$ of the steering force is smaller than the lower threshold F1. If "YES", then control goes to the step $P_{10}$ to output a direct coupling signal. If "NO", then control goes to the step P, to output a speed increasing signal.

The step $P_{13}$ determines whether the corrected value $F\phi$ of the steering force is larger than the upper threshold F2. If "YES", then control goes to the step P, to output a speed increasing signal. If "NO", then control goes to the step $P_{10}$ to output a direct coupling signal.

When the output signal is a speed increasing signal, the speed increasing clutch 50 is engaged or "ON", and the direct coupling clutch 30 is disengaged or "OFF". When the output signal is a direct coupling clutch, the direct coupling clutch 30 is engaged or "ON" and the speed increasing clutch 50 is disengaged or "OFF".

Figure 13:
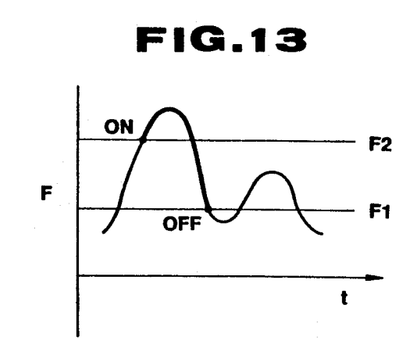
FIGS. 13 and 14 are graphs showing the timing for switching the speed increasing device of the invention.

One example of the timing for enabling and disabling the speed increasing function under the above speed increasing control while the vehicle speed V is constant is shown in FIG. 13. Points indicated by "ON" and "OFF" in FIG. 13 represent the enabling and disabling, respectively, of the speed increasing function.

As can be understood from the above description, the speed increasing device in the power transmission path leading to the auxiliary drive road wheels is not switched after detecting a turn condition of the motor vehicle, but is controlled by predicting various turning conditions based on predictive steering variables such as a vehicle speed and a steering force. Accordingly, the speed increasing device can be enabled and disabled without any control time lag or delay, i.e., can instantaneously be switched with increased response.

Figure 14:
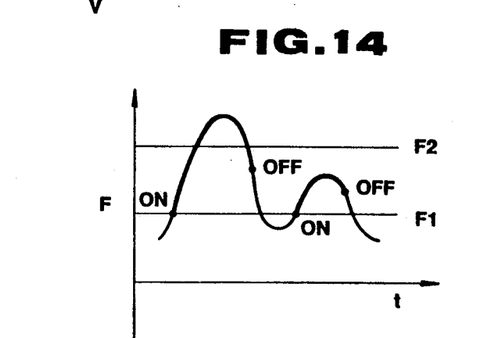

FIG. 14 shows by way of example the timing for switching the speed increasing device based on a time-dependent change in the steering force, which is given by differentiating the steering force F(t). As shown in FIG. 14, when the corrected value $F\phi$ of the steering force exceeds the lower threshold F1 and a differential F'(t) of the steering force is larger than a present value, then the speed increasing function is enabled. Conversely, when the corrected value $F\phi$ of the steering force drops below the upper threshold F2 and the differential F'(t) thereof is smaller than the preset value, then the speed increasing function is disabled.

Under a steering condition in which the steering force is larger than the lower threshold F1 and its time-dependent change is larger than the preset value, i.e., a quick turn is desired, the drive power from the engine is transmitted via the speed increasing mechanism to the auxiliary drive road wheel differential so that $\omega' > \omega$, to increase the turning performance of the motor vehicle in low- and medium-speed ranges and the motor vehicle stability in a high-speed range. Under a steering condition in which the steering force is lower than the upper threshold F2 and its time-dependent change is smaller than the preset value, i.e., a quick return to a straight running course is desired, the speed increasing function is disabled and a directly coupled condition is resumed.

In the above embodiments, the steering force is detected as a steering variable indicating a turn of the motor vehicle. However, a steering angle or a steering speed may be employed as a steering variable. The structure and arrangement of the speed increasing device, and the manner in which the torque transmitting clutches is controlled, are not limited to the illustrated embodiments.

With the 4WD motor vehicle according to the present invention, as described above, the speed increasing device disposed in the power transmission path leading to the auxiliary drive road wheels is switched based on a steering condition, i.e., controlled without any substantial time lag by predicting a turning condition of the motor vehicle based on a steering force, a steering angle, or the like. Therefore, the speed increasing device can instantaneously be switched with high response.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. An apparatus for driving the front and rear road wheels of a motor vehicle having a pair of main drive road wheels, a pair of auxiliary drive road wheels, and a differential disposed between the auxiliary drive road wheels, said apparatus comprising:

a speed increasing device disposed in a power transmission path leading to said differential between the auxiliary drive road wheels, said speed increasing device including input and output shafts and being switchable between a direct coupling state in which the rotational speed of the input shaft is the same as that of the output shaft and a speed increasing state in which the rotational speed of the output shaft is greater than that of the input shaft;

detecting means for detecting a steering variable;

control means for enabling said speed increasing device to be switched by predicting a turn of the motor vehicle at least based on the detected steering variable; and said differential including clutch means for adjusting the amounts of input drive forces to be transmitted via said power transmission path independently to each opposing one of said pair of auxiliary drive road wheels.

2. An apparatus according to claim 1, wherein
   said detecting means includes means for detecting a speed of travel of the motor vehicle; and
   said control means includes means for controlling said speed increasing device dependent on a predicted steering value calculated based on said detected speed and a time-dependent change of said detected steering variable.

3. An apparatus according to claim 2, wherein
   said speed increasing device includes direct coupling means for directly coupling said main and auxiliary drive road wheels in relation to the relative transmission of the drive forces thereto, and speed increasing means for increasing the speed of rotation of the input drive forces transmitted to said auxiliary drive road wheels; and said control means includes means for defining with respect to said predicted steering value a threshold corresponding to said detected speed and for enabling said speed increasing means when said predicted steering value exceeds said threshold.

4. An apparatus according to claim 3, wherein said control means includes means for defining upper and lower limits for said threshold and for enabling said speed increasing means when said predicted steering value exceeds said lower limit and a time-dependent change of said predicted steering value is higher than a first predetermined value, and for disabling said speed increasing means and enabling said direct coupling means when said predicted steering value is lower than said upper limit and a time-dependent change of said predicted steering value is lower than a second predetermined value.

5. An apparatus according to claim 2, wherein said steering variable is a steering force applied to the steering wheel of the motor vehicle.

6. An apparatus according to claim 2, wherein said steering variable is a steering angle through which the steering wheel of the motor vehicle is turned.

7. An apparatus for driving the main and auxiliary road wheels of a motor vehicle having main and auxiliary drive road wheel mechanisms, said apparatus comprising:
 a power transmission mechanism operatively interconnecting the main and auxiliary drive road wheel mechanisms in a power transmitting relationship;
 a speed increasing device disposed in said power transmission mechanism for increasing the speed of rotation of input drive forces to be transmitted to the auxiliary drive road wheel mechanism, said speed increasing device including input and output shafts and being switchable between a direct coupling state in which the rotational speed of the input shaft is the same as that of the output shaft and a speed increasing state in which the rotational speed of the output shaft is greater than that of the input shaft;
 detecting means for detecting a steering variable;
 control means for calculating a predicted steering value at least based on the detected steering variable, and for enabling said speed increasing device to be switched when a prescribed steering condition is predicted from the predicted steering value; and said auxiliary drive road wheel mechanism including clutch means for adjusting the amounts of input drive forces to be transmitted via said power transmission mechanism independently to each opposing one of said pair of auxiliary drive road wheels.

8. An apparatus according to claim 7, wherein said detecting means includes means for detecting a speed of travel of the motor vehicle, and said control means includes means for defining with respect to said predicted steering value a threshold corresponding to said detected speed and for enabling said speed increasing device when said predicted steering value exceeds said threshold.

9. An apparatus according to claim 8, wherein said control means includes means for defining upper and lower limits for said threshold and for enabling said speed increasing device when the motor vehicle is in a first steering condition in which said predicted steering value exceeds said lower limit and a time-dependent change of said predicted steering value is higher than a first predetermined value, and for disabling said speed increasing device when the motor vehicle is in a second steering condition in which said predicted steering value is lower than said upper limit and a time-dependent change of said predicted steering value is lower than a second predetermined value.

10. An apparatus according to claim 9, wherein
 said speed increasing device includes direct coupling means for directly coupling said main and auxiliary drive road wheel mechanisms in relation to the relative transmission of the drive forces thereto, and speed increasing means for increasing the speed of rotation of the input drive forces transmitted to said auxiliary drive road wheel mechanisms; and
 said control means includes means for enabling said speed increasing means and controlling said clutch means to transmit a larger drive force to outer road wheels on a cornering circle, at least when the motor vehicle is in said first steering condition.

11. An apparatus according to claim 10, wherein said control means includes means for disabling said speed increasing means and enabling said direct coupling means when the motor vehicle enters from said first steering condition into said second steering condition.

* * * * *